2 Sheets--Sheet 1.

H. W. ADAMS.

Improvement in Steam-Engines.

No. 5,128. Reissued Nov. 5, 1872.

Witnesses:
O. E. Duff
D. P. Lowe

Inventor:
H. W. Adams,
By his Att'ys.
Howson & Sons

A.M. PHOTO-LITHOGRAPHIC CO. N.Y. (OSBORNE'S PROCESS.)

2 Sheets--Sheet 2.
H. W. ADAMS.
Improvement in Steam-Engines.
No. 5,128. Reissued Nov. 5, 1872.
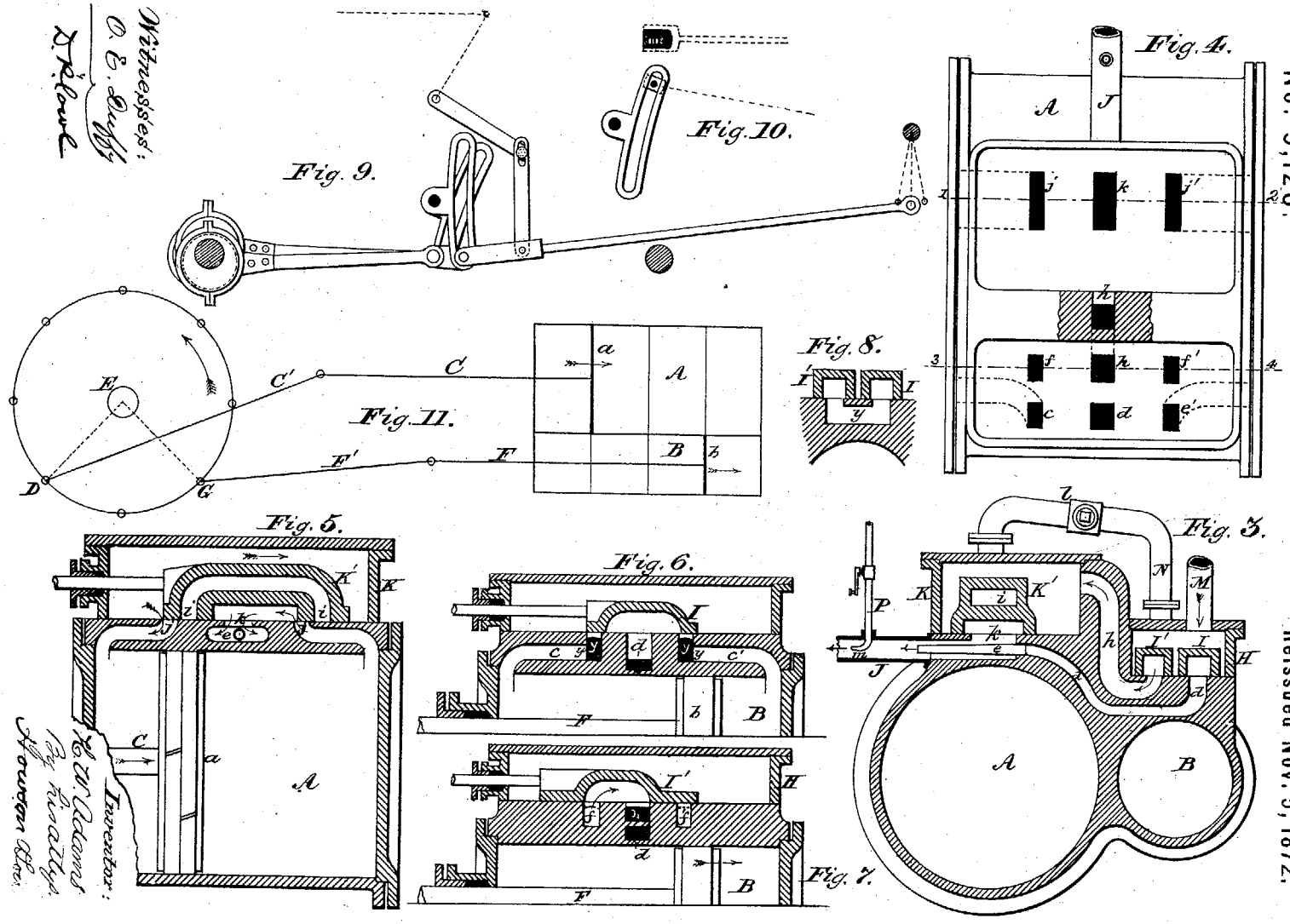
Witnesses:
O. E. Duffy
D. R. Lowe
Inventor:
H. W. Adams
By his atty.
Howson & Son
AM. PHOTO-LITHOGRAPHIC CO. N.Y. (OSBORNE'S PROCESS.)

UNITED STATES PATENT OFFICE.

HENRY W. ADAMS, OF PHILADELPHIA, PENNSYLVANIA.

IMPROVEMENT IN STEAM-ENGINES.

Specification forming part of Letters Patent No. 115,672, dated June 6, 1871; reissue No. 5,128, dated November 5, 1872.

*To all whom it may concern:*

Be it known that I, HENRY W. ADAMS, of Philadelphia, county of Philadelphia and State of Pennsylvania, have invented an Improvement in Steam-Engines, of which the following is a specification:

*Nature and Object of the Invention.*

My invention consists of a double-cylinder steam-engine, constructed and operating in the peculiar manner too fully explained hereafter to need preliminary description with the view of economizing steam.

*Description of the Accompanying Drawing.*

Figure 1:
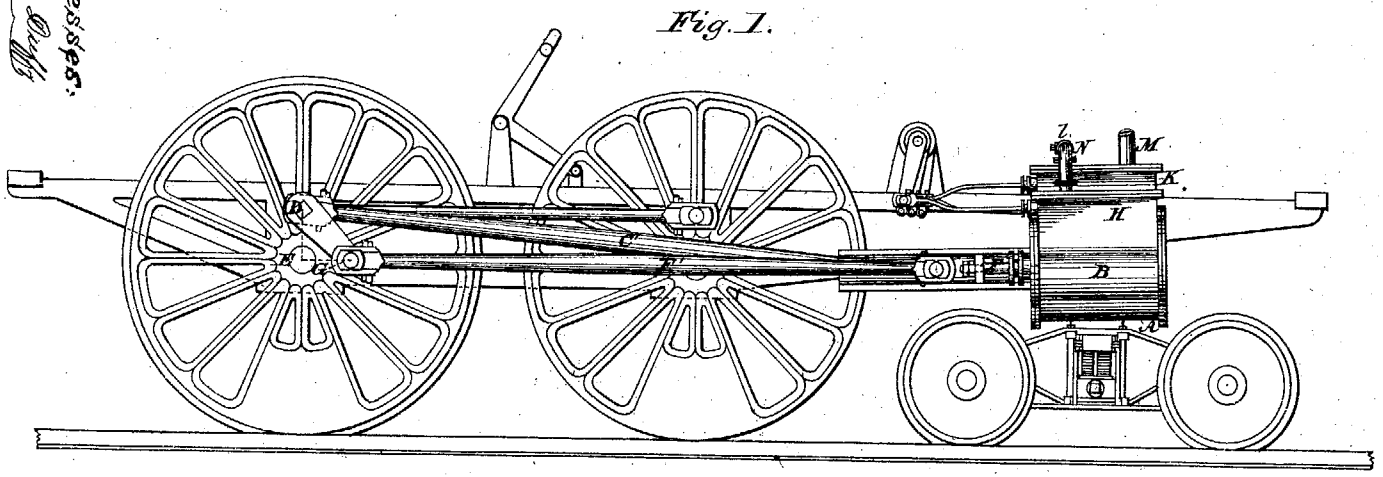
Figure 2:
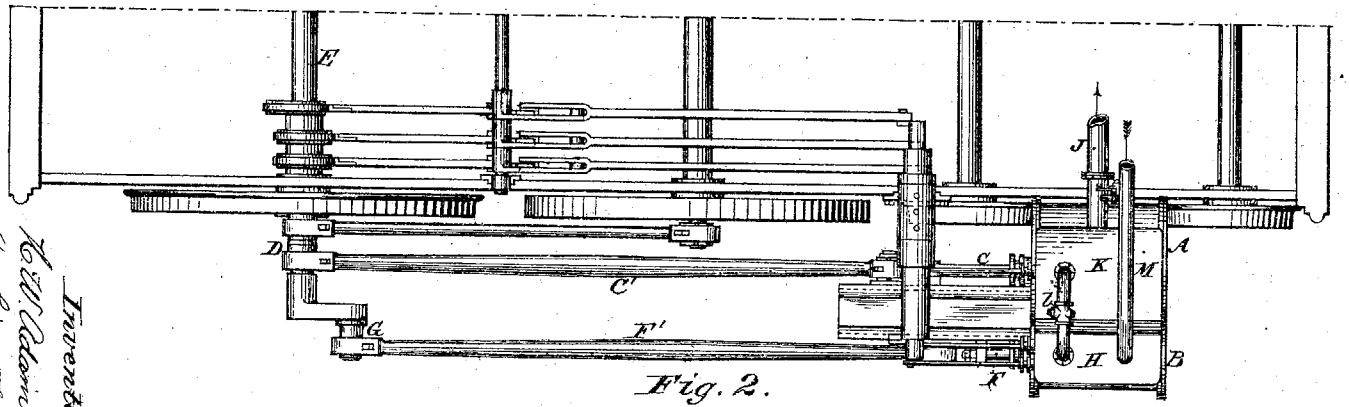

Figure 1, Sheet No. 1, is a side view representing my improved steam-engine; Fig. 2, a plan view of Fig. 1; Fig. 3, Sheet No. 2, a transverse section of the two steam-cylinders, valves, and valve-chests; Fig. 4, a plan view of the cylinders, with valves and valve-chest covers removed; Fig. 5, a longitudinal section of the large cylinder on the line 1 2, Fig. 4; Fig. 6, a longitudinal section of the smaller cylinder on the line 5 6, Fig. 4; Fig. 7, a longitudinal section on the line 3 4, Fig. 4; Fig. 8, a transverse section on the line 7 8, Fig. 4; Figs. 9 and 10, views of the valve-motion; and Fig. 11, a diagram illustrating my invention.

*General Description.*

My improved steam-engine has two cylinders, A B, the former being of larger size than the latter, as shown in Fig. 3, and the pistons of these cylinders are connected to the driving-shaft or axle in the peculiar manner illustrated in Figs. 1 and 11, the piston-rod C of the larger cylinder being connected by a rod, C′, to the crank-pin D of the driving-axle E, and the piston-rod F being connected by a rod, F′, to the crank-pin G of the same axle. The cranks are, in the present instance, situated at right angles to each other, and it may be remarked in the outset that an effectual carrying out of my invention is dependent upon the manner of connecting the pistons of the two cylinders to the driving-shaft or axle, and this manner can be best understood by reference to the diagram, Fig. 11. Thus, supposing the axle E, Fig. 11, to be turning in the direction of the arrow, and the two crank-pins D and G to be in the position shown, the piston *a* of the large cylinder A will have completed one-fourth of its movement in the direction of the arrow, while the piston *b* of the smaller cylinder has completed three-fourths of its movement in the same direction. My improved steam-engine is, in the present instance, illustrated as applied to a locomotive, in a manner too clearly illustrated in the drawing to need explanation. It should be understood, however, that my invention may be applied to stationary, marine, and, in fact, to engines of every class. The steam-chest H of the smaller cylinder B contains two valves, I and I′, the former being arranged and operated to alternately open and close the ports *c* and *c′*, and to direct the exhaust-steam from the said smaller cylinder to the passage *d*, which terminates in a nozzle, *e*, the point of the latter projecting into the exhaust-pipe J, (see Fig. 3.) The other valve, I′, in the steam-chest H will be best observed in Fig. 7, its duty being to direct the steam from the small cylinder through one or other of the ports *j* or *j′*, and, under the circumstances described hereafter, through a passage, *h*, to the steam-chest K of the larger cylinder A. This steam-chest contains a valve, K′, of the peculiar construction seen in Fig. 5. The valve has a passage directly through it, the said passage terminating in the ports *i i*, which, under the circumstances described hereafter, coincide with the ports *j j* of the large cylinder A, the valve also serving to direct the exhaust steam to the passage *k*, and thence to the exhaust-pipe J. Live steam from the boiler is admitted to the steam-chest H through a pipe, M, and a pipe, N, extends from the steam-chest H to the steam-chest K, the said pipe being provided with a cock, *b*, which should be opened only under the emergencies referred to hereafter. P, Fig. 3, is a small pipe communicating with the steam-space of the boiler and terminating in a nozzle, *m*, arranged within the exhaust-pipe J and bent outward, as shown, the pipe P being furnished with a cock or valve, which should be under the control of the engineer. In order that the movements of these valves and their duties may be thoroughly understood, it will be best to follow the course pursued by the steam during the movement of the engine. On referring to the diagram, Fig. 11, it will be seen that the piston *a* of the large cylinder has completed one-fourth of its movement in the direction of the arrow, and the piston *b* three-fourths of its movement in the same direction, the crank-shaft E revolving in the direction of its arrow.

When the pistons of the two cylinders are in the above positions live steam from the boiler, which had previously been acting on the piston of the smaller cylinder, is cut off from the same, the valve I closing both ports *c* and *c'*, as shown in Fig. 6. In the meantime the valve I' has arrived at the position shown in Fig. 7, and, consequently, the steam in front of the piston *b* escapes through the passage *h* to the steam-chest K of the larger cylinder; for there is a lateral passage, *y*, between the port *c*, covered by the valve I and the port *f*, from which to the passage *h* the valve I' now affords a communication. The steam, which had exerted its pressure on the smaller cylinder is now free to enter the large cylinder as soon as the valve K' permits it, and this valve commences to open the port *j* as soon as the large piston has completed one-fourth of its movement, as shown in Fig. 11; at the same time the steam at the rear of the large piston *a* commences to exhaust through the port *k* into the exhaust-pipe J. The piston *a* arrives at the position of half-stroke under the pressure of the expanding steam, while the small piston, under the same pressure, completes its stroke, the steam at its rear having been previously exhausted through the nozzle *e* into the exhaust-pipe J. The large piston being now at half stroke, and the small piston at the termination of its stroke, the valve I' has closed the communication between the small cylinder and the steam-chest of the large cylinder. Live steam is now admitted by the valve I to the rear of the piston of the small cylinder, the steam at the opposite side passing off through the nozzle *e* into the exhaust-pipe J; hence the small piston commences its return stroke under the pressure of live steam, while the large piston completes its stroke under the pressure of expanding steam only. We will now suppose the large piston to have arrived at the end of its stroke, and the returning small piston to have reached its half-stroke. At this point the valve K' has been so moved that its passage *i* commences to form a communication between the opposite sides of the piston of the large cylinder, and this communication is open until the large piston is carried back to the extent of a quarter of its stroke, when the communication is closed by the valve K', which also opens the front end of the large cylinder to the exhaust-pipe J. It will be thus seen that the pressure on both sides of the large piston is equalized, while the said piston returns from the limit of its outward movement to the extent of one-quarter of its stroke. The pistons have now arrived at the position the reverse of that shown in Fig. 11—that is to say, the large piston has completed one-quarter of its return stroke, while the small piston has completed three-quarters of its return movement. The steam at the rear of the large piston is now re-enforced by the exhausting steam from the front of the piston in the smaller cylinder. Precisely the same operation now takes place with the valves and with the course of the steam in returning the pistons to their original positions, shown in the diagram, Fig. 11.

I will now proceed to describe the pressures of the steam as exerted on the cranks in their different positions, presuming them to be, in the first instance, in the position shown in the diagram, and presuming, also, that the large cylinder is double the diameter of the smaller, and that the area of its piston is four times as great as that of the smaller cylinder. I have ascertained that the best results can be obtained when about these proportions are adhered to. If steam at one hundred pounds' pressure be admitted into the small cylinder B, it will at this pressure force the piston *b* to the position of three-quarters stroke, and in so doing will act upon and turn the crank-pin G while the latter is in its most advantageous position for receiving the power thus transmitted. As soon, however, as the piston *b* reaches the position of three-quarters stroke the steam will be cut off, as before described, and communication will be opened with the large cylinder A, the piston *a* of the latter being in the position of one-quarter stroke, as shown in the diagram. The pressure of the steam acting upon the pistons *b* and *a* is thus suddenly reduced from one hundred pounds' to forty-two and eight-tenths pounds' pressure, or rather to fifty-one and five-tenths pounds' pressure, as there is already, if the engine has been running a short time, steam at fifteen pounds' pressure in the large cylinder. This calculation is based upon the supposition that the large cylinder has a capacity four times as great as the small cylinder, and that the space in front of the piston *a*, when the latter is at one-quarter stroke, and which is to be filled with steam, is, therefore, as large as the whole of the cylinder B, which has been three-quarters filled with steam. Steam at the above pressure—namely, fifty-one and five-tenths pounds—will act upon both of the pistons *a* and *b*, and will force the same in the direction of the arrows in the diagram; but as this steam is worked expansively the pressure will become reduced to thirty pounds by the time the piston of the large cylinder has reached the position of half-stroke and that of the small cylinder has completed its forward movement. Although the steam, when commencing to act upon the piston *a* of the large cylinder, is only at about half the pressure of that admitted into the smaller cylinder, yet the area of the said piston *a* is four times as great as the smaller piston *b*, so that it exerts twice as much power as the latter upon its crank D, and at a period when the latter is in the most advantageous position, as will be plainly seen on reference to the diagram. When the piston *a* of the large cylinder is at half-stroke the pressure of the expanding steam exerted upon the same and its crank D will be thirty pounds, and this pressure is exerted at the period when the crank G of the smaller cylinder, arranged at right angles to the crank D, is about passing its dead-center point. When the piston *a* is at three-quarters stroke the pressure of the expanding steam will have become reduced to twenty-two and five-tenths pounds; but the piston *b* of the smaller cylinder will at this period have reached the position of quarter-stroke on its return movement, acted on by live steam at a pressure of one hundred pounds. The pressure of the expanding steam in the large cylinder will become still further reduced to fifteen pounds by the time the piston reaches the limit of its forward movement, and the instant the motion of the said piston is reversed this pressure will be equalized on both sides of the same by means of the valve K′ and its passage *i*, as before described. Although the pressure exerted upon the crank D of the large cylinder is thus reduced to the lowest degree at the moment the said crank is passing its dead-center it will be carried past this point by the crank G of the small cylinder, which is now in its most advantageous position, or at half-stroke, and acted on by steam at a pressure of one hundred pounds. During the first portion of the return movement of the piston *a* of the large cylinder, and until it arrives at the position of quarter-stroke, the communication between the front and rear of the said piston remains open; but on reaching this point it is cut off by the valve *k*′, which also opens the exhaust-port in front of the piston. The parts have now reached a position the reverse of that shown in the diagram, and simultaneously with the opening of the exhaust in front of the piston *a*, and with the closing of the equalizing-passage *i* of the valve, the re-enforcing steam is admitted from the small cylinder into the space at the rear of the said piston *a*. This space is already filled with steam at fifteen pounds' pressure, admitted, as above described, to equalize the pressure at both sides of the piston during the first portion of the movement of the latter; and this low-pressure steam, which has already been used in both cylinders, becomes a third time utilized, as it is combined with the re-enforcing steam, and serves to raise the pressure of the latter from forty-two and eight-tenths to fifty-one and five-tenths pounds. A partial vacuum is also produced in front of the piston *a*, owing to the action of the ejector *m* in the exhaust-pipe, so that nearly the whole pressure of the re-enforced steam is exerted upon the said piston. The said ejector or nozzle *m*, being in constant operation, acts in the same way in producing a partial vacuum at that side of the piston in either cylinder from which the steam has to be finally exhausted. The tube *e*, connected to the passage *d*, also aids the nozzle *m* in maintaining this partial vacuum. In instances where it is desirable to considerably increase the power of the engine for a short time, as in starting the load before the live-steam cylinder exhausts into the expansion-cylinder, and in ascending steep grades, &c., live steam at a high pressure may be admitted into the large cylinder as well as into the cylinder B by opening the cock *l* in the pipe N, which connects the steam-chests H and K together. This is an important feature of my invention.

*Claims.*

1. A steam-engine in which the steam from a small cylinder is admitted into a larger cylinder, in combination with a valve and a pipe, by which live steam may, as occasion requires, be admitted to the larger cylinder to re-enforce the power of the engine, as shown and described.

2. A double-cylinder steam-engine having passages arranged and valves operating, substantially as set forth, so that the within-described actions of the steam on the pistons will occur when the latter and the cranks are in substantially the positions hereinbefore explained.

3. In a double-cylinder engine, a nozzle, *e*, for the escape of exhaust steam from the small cylinder into the pipe through which the larger cylinder is exhausted.

4. The combination, with the exhaust-pipe of a steam-engine, of a nozzle, through which live steam can be discharged into the said pipe.

In testimony whereof I have signed my name to this specification in the presence of two subscribing witnesses.

HENRY W. ADAMS.

Witnesses:
WM. A. STEEL,
JOHN K. RUPERTUS.